Patented June 6, 1950

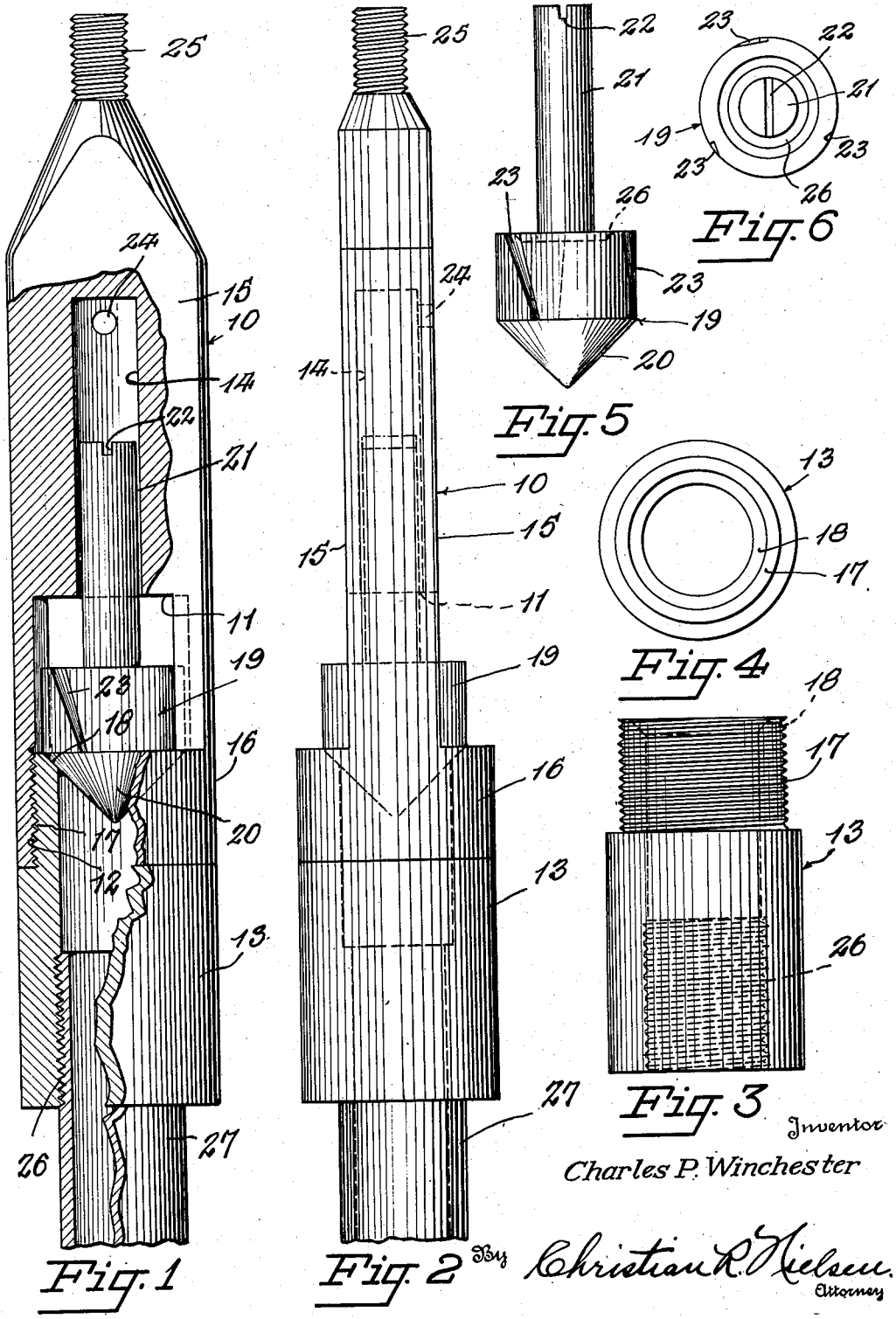

2,510,489

UNITED STATES PATENT OFFICE 2,510,489

PUMP VALVE

Charles P. Winchester, Joplin, Mo.

Application June 12, 1945, Serial No. 599,105

1 Claim. (Cl. 251—129)

This invention relates to pump valves employed in oil and water tubing pumps, and it consists in the constructions, arrangements and combinations herein described and claimed.

It is a particularly important object of the invention to provide a pump valve wherein a large exhaust opening is provided, thus increasing the efficiency of a pump equipped with the valve.

It is also an important object of the invention to provide a valve assembly in which the valve parts may be readily dismantled, for the purpose of grinding the seating face of the valve when required.

It is a still further object of the invention to provide a valve element which is rotatable under influence of outgoing liquid so that the valve will not seat repeatedly upon the same surface of the valve seat.

A still further object of the invention is the provision of means for guiding the valve in a true vertical path, as well as providing means eliminating the development of a vacuous condition which would hinder quick and proper seating of the valve.

Additional objects, advantages and features of invention will be apparent from the following description considered in conjunction with the accompanying drawings, wherein Figure 1 is a vertical section, shown partly in elevation, of a valve constructed in accordance with the invention.

Figure 2 is an elevation of the valve at right angles to Figure 1.

Figure 3 is an elevation of a combined coupling and valve seat.

Figure 4 is a top plan view thereof.

Figure 5 is a side elevation of the valve.

Figure 6 is a top plan view thereof.

There is illustrated an elongated cage 10 formed from a cylindrical piece of metal in one end of which there is formed a longitudinal bore 11 interiorly threaded for a distance, as at 12, for connection of a combined coupling and valve seat 13, as will be described. The smooth portion of the bore is of a length approximately twice the length of the valve proper to be accommodated. Concentric with the bore 11 there is a reduced bore 14 for reception of a stem of the valve as will be described.

The cylindrical piece is cut horizontally at opposite sides immediately above the threads 12 and then cut longitudinally, defining flat faces 15, the remaining portions of the piece being semi-cylindrical and contiguous with the surface of the collar 16.

By thus forming the cage 10, the bore 11 opens laterally upon the flat faces 15.

The combined coupling and valve seat 13 is formed from a cylindrical tube, a portion of which is of a reduced diameter and exteriorly threaded as at 17, complemental to the threads 12 of the cage. A conical valve seat 18 is formed upon the face of the reduced portion, to seat a valve 19 disposed within the bore 11 of the cage.

The valve 19 is of a cylindrical form for the main part and is formed with a conical head 20 for seating engagement with the seat 18. A stem 21 is integrally formed with the body of the valve 19 extending axially therefrom and is disposed in the bore 14 of the cage and is reciprocable therein during operation, as will be explained. A slot 22 extends transversely of the stem adapted to receive the blade of a screw-driver for grinding of the valve to the seat.

Spaced circumferentially of the body of the valve, vanes 23 are provided, these being of different depths so as to accommodate different sized pump valves, these vanes functioning to impart rotation of the valve under operation, thus making it possible to insure movement of the valve in a manner to prevent repeated seating of the valve upon the same surface of the valve seat.

A vent 24 opens between the bore 14 and one of the flat faces 15 of the cage, the vent thus prevents the development of a suction or the building up of pressure which would tend to prevent upward movement of the valve and stem.

The upper end of the cage 10 is reduced and threaded as at 25, for reception of a sucker rod not shown.

The lower end of the combined coupling and valve seat is interiorly threaded as at 26, and receives a pipe 27.

In use, with the device installed in a well casing, and a sucker rod connected to the end 25, for the purpose of reciprocation, it will be seen that upon downward movement of the cage 10, the valve 19 will be raised from the seat 18, permitting the liquid being pumped to pass above the valve through the open sides of the bore 11. On the upward movement of the cage, the valve will be seated by action of gravity due to the weight of the valve, and this weight will be increased by the formation of a cup 26 in the upper face of the valve, for reception of liquid being pumped. It will be apparent that the valve 19 will be free floating, in a balanced and centered location above the valve seat during open position of the valve, and this will be true regardless of whether the pump tubing is in direct vertical alignment in a well hole.

When the valve 19 is unseated, it will be apparent that liquid will encounter the vanes 23, effecting a rotation of the valve, so that upon the next seating of the valve different surfaces between the valve face and seat will be brought into contacting engagement.

It sometimes becomes necessary to reseat the valve seat 18, and this may be readily accomplished by pulling the pump line so as to expose the threaded joint between the cage and the valve seat and coupling, and unscrewing and removing the cage 10 therefrom. Access is then had to the valve 19 which may be removed from the seat 18. The face of the valve seat can be ground by applying a grinding compound to the seat, replacing the valve and rotating it by applying a screw driver blade in the slot 22. After regrinding any remaining compound should be wiped off, the valve replaced and the cage engaged with the coupling 13.

From the foregoing it will be seen that I have provided a valve of extreme simplicity, of few parts, and one which will be highly efficient in operation, and while I have shown and described a preferred form of the device, this is by way of illustration only and I consider as my own all such modifications as fairly fall within the scope of the appended claim.

I claim:

In a pump valve assembly, a cage including a cylindrical collar and an elongated member integral with and extending from one end of said collar with the longitudinal axis of the member and the axis of the collar coaxial, said member being provided with a pair of opposed faces extending longitudinally thereof, the distance between the faces being appreciably less than the outside diameter of said collar; means forming a valve seat in said collar; a transverse opening formed in said member adjacent said valve seat; a longitudinal bore formed in said member and registering at one end thereof with said opening; a valve in said opening and freely reciprocable therein toward and away from said valve seat; and a guide stem on the valve extending into the bore for holding the valve spaced from said member as the valve reciprocates, said valve having a cup-shaped, normally uppermost face adjacent said stem extending outwardly through said opening in opposite directions beyond said faces of the member.

CHARLES P. WINCHESTER.

REFERENCES CITED

The following references are of record in the file of this patent:

UNITED STATES PATENTS

| Number | Name | Date |
| --- | --- | --- |
| 1,441,646 | Vaughn | Jan. 9, 1923 |
| 1,484,997 | Rossiter | Feb. 26, 1924 |
| 1,510,190 | Odum | Sept. 30, 1924 |
| 1,610,602 | Crickmer | Dec. 14, 1926 |
| 1,942,616 | Sandlin | Jan. 9, 1934 |
| 2,077,716 | Sandlin | Apr. 20, 1937 |